A. BRAUER, DEC'D.
C. BRAUER, EXECUTRIX.
ROTARY ENGINE.
APPLICATION FILED APR. 3, 1918.
1,363,389.
Patented Dec. 28, 1920.
5 SHEETS—SHEET 1.
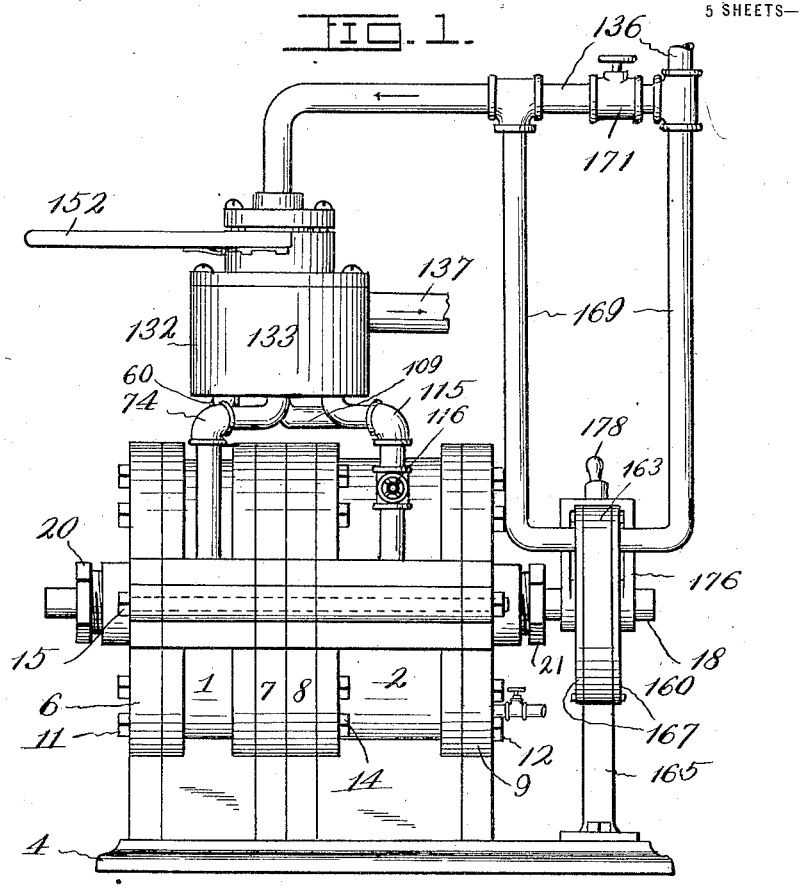
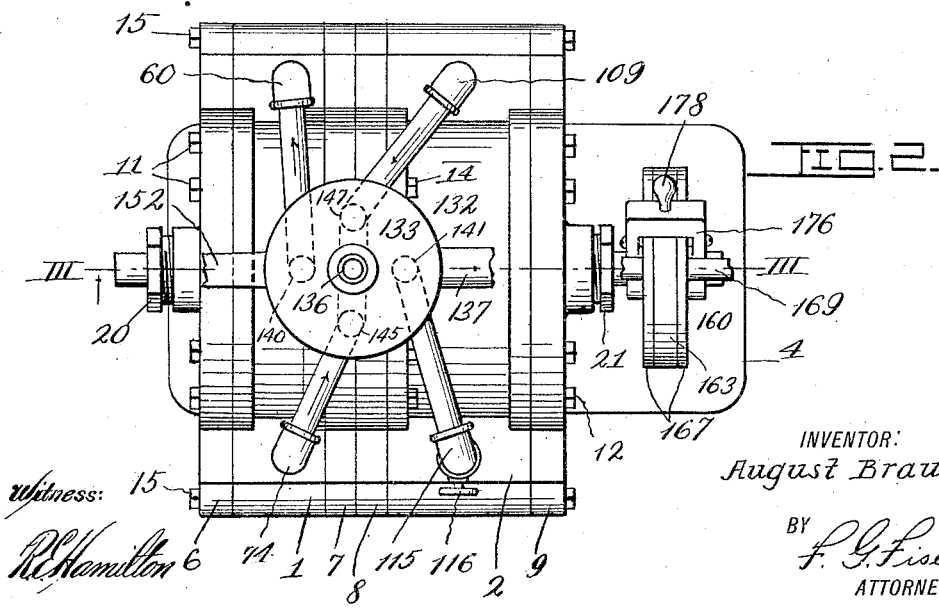
INVENTOR:
August Brauer,
BY
F. G. Fischer,
ATTORNEY

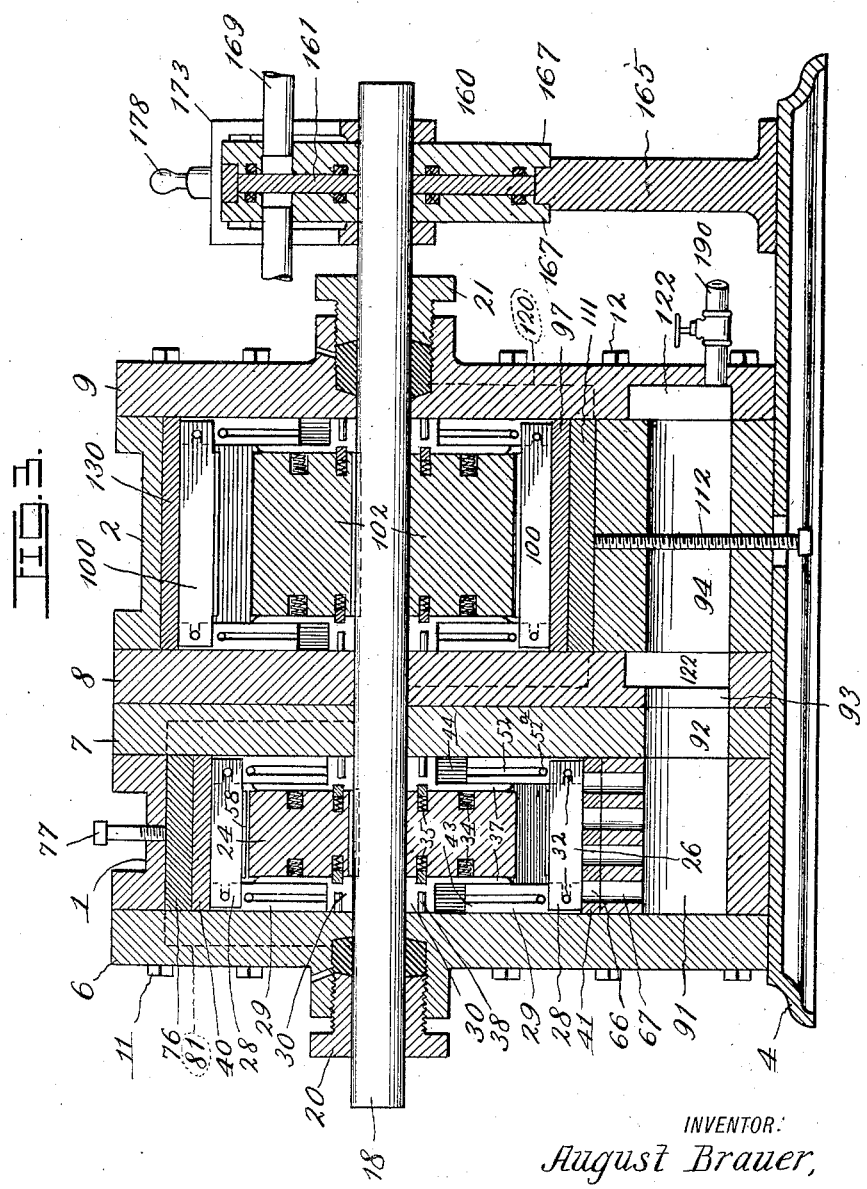

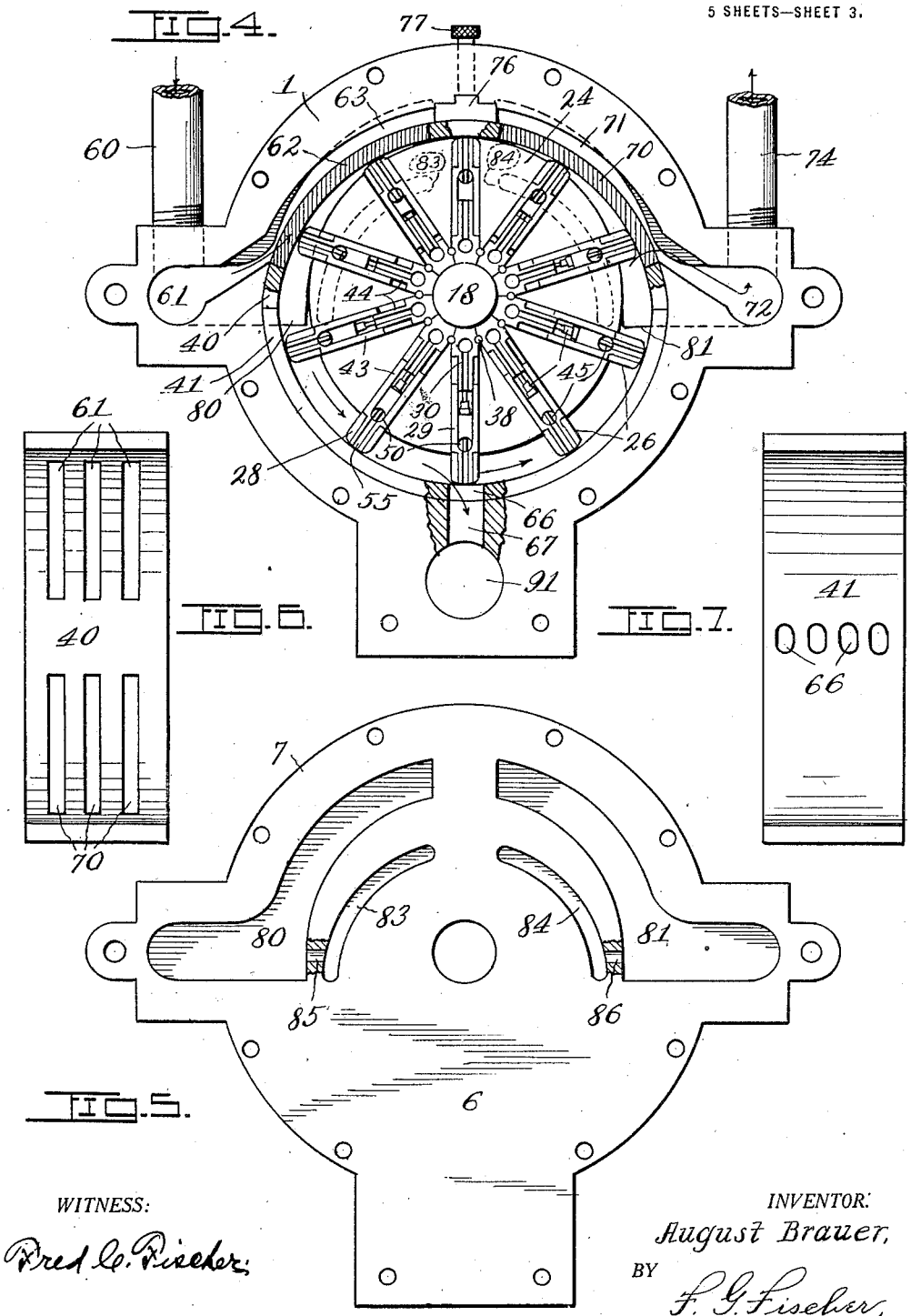

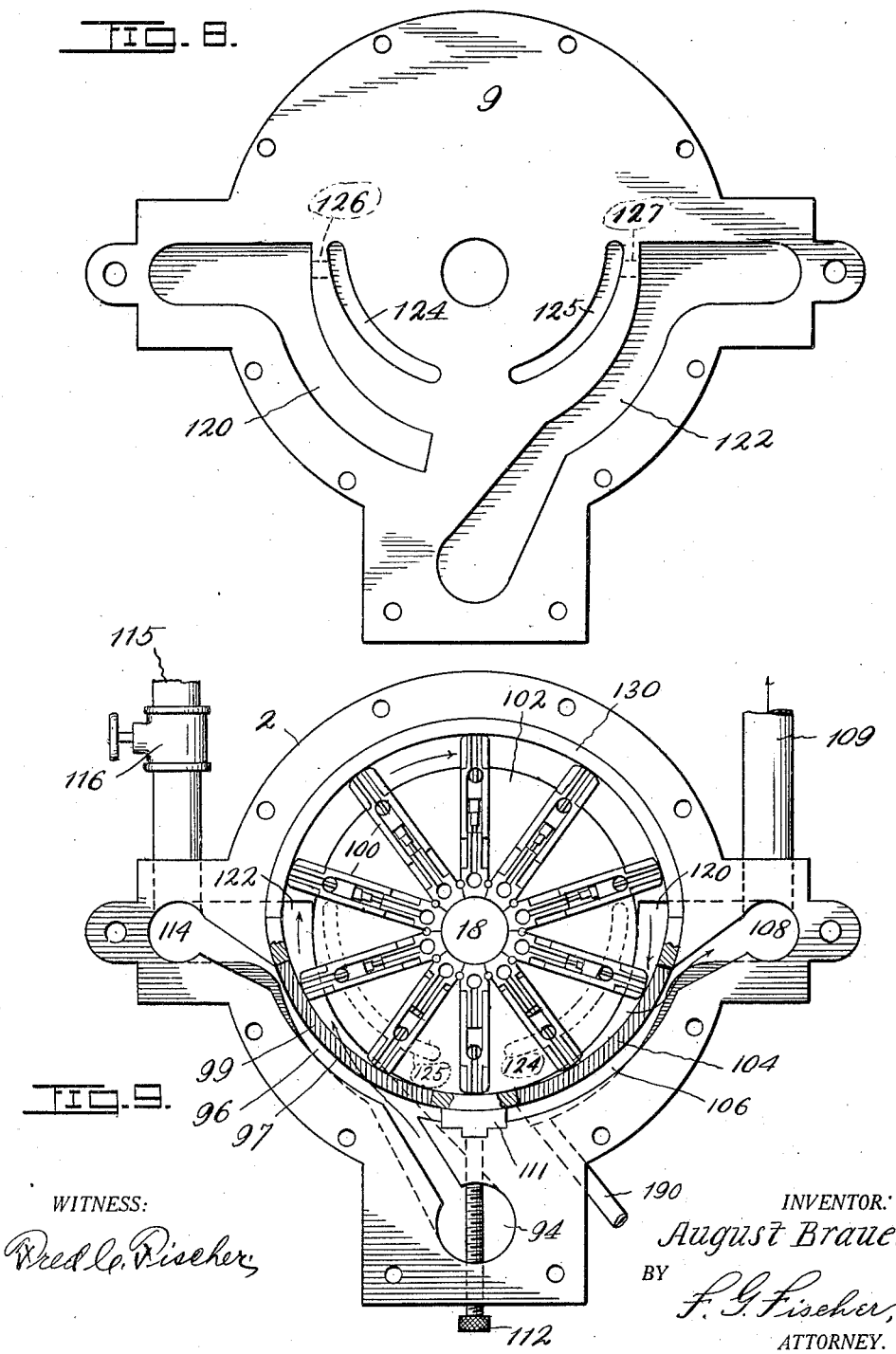

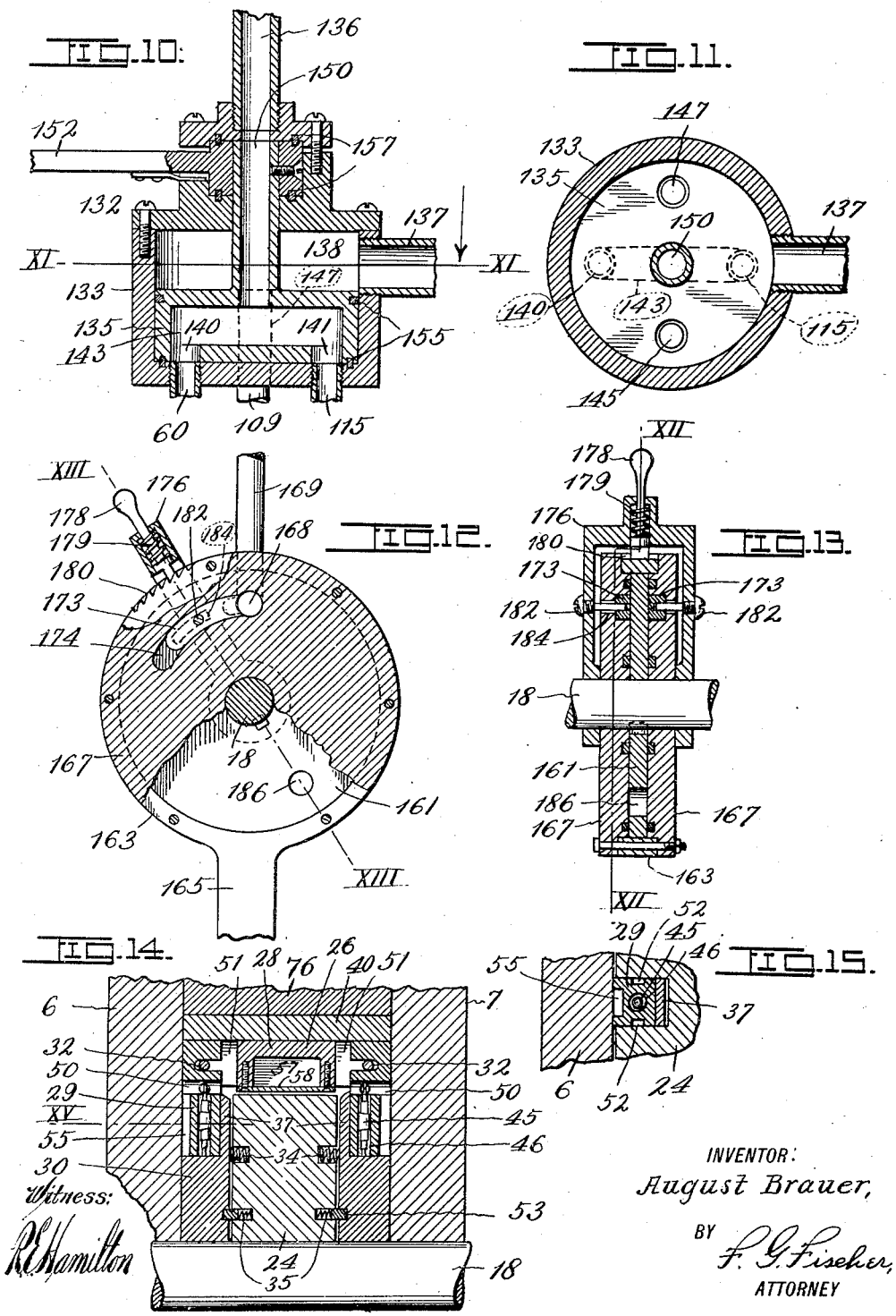

UNITED STATES PATENT OFFICE.

AUGUST BRAUER, OF INDEPENDENCE, MISSOURI, ASSIGNOR OF ONE-HALF TO GEORGE P. A. WEISENBORN, OF KANSAS CITY, MISSOURI; CHARLOTTA BRAUER EXECUTRIX OF SAID AUGUST BRAUER, DECEASED.

ROTARY ENGINE.

1,363,389.  Specification of Letters Patent.  Patented Dec. 28, 1920.

Application filed April 3, 1918. Serial No. 226,379.

*To all whom it may concern:*

Be it known that I, AUGUST BRAUER, a citizen of the United States, residing at Independence, in the county of Jackson and State of Missouri, have invented certain new and useful Improvements in Rotary Engines, of which the following is a specification.

My invention relates to rotary engines, and one object is the provision of a new and useful engine of this type in which steam is used economically and efficiently in propelling the rotary pistons of said engine.

A further object is the provision of an engine in which the direction of travel of the pistons can be reversed at the will of the engineer.

Another object is the provision of an engine in which friction and wear is reduced to a minimum, and in which access to the interior mechanism can be readily had for inspection and repairs.

Other objects of the invention will hereinafter appear, and in order that said invention may be readily understood, reference will now be made to the accompanying drawings, in which:

Figure 1 is a side elevation of an engine constructed in accordance with my invention.

Fig. 2 is a plan view of the engine.

Fig. 3 is an enlarged vertical, longitudinal section partly broken away, on line III—III of Fig. 2.

Fig. 4 is a side elevation partly in section of the primary cylinder with the cylinder head at the left removed to show the interior mechanism.

Fig. 5 is a side elevation of one of the cylinder heads for the primary cylinder.

Fig. 6 is an inverted plan view of an upper bushing for the primary cylinder.

Fig. 7 is a plan view of a lower bushing for the primary cylinder.

Fig. 8 is a side elevation of one of the cylinder heads of the secondary cylinder.

Fig. 9 is a side elevation partly in section of the secondary cylinder with the cylinder head at the right removed.

Fig. 10 is a vertical section of a throttle valve for controlling the inlet and exhaust of steam to and from the cylinders.

Fig. 11 is a horizontal section on line XI—XI of Fig. 10.

Fig. 12 is an irregular, vertical sectional view of an automatic cutoff whereby steam to the cylinders may be cut off and used expansively during a portion of each revolution of the pistons.

Fig. 13 is a section on line XIII—XIII of Fig. 12.

Fig. 14 is a broken cross sectional view of the upper portion of the primary cylinder and the mechanism therein.

Fig. 15 is a broken cross section on line XV of Fig. 14.

In carrying out the invention in its preferred form, I employ a primary cylinder 1 and a secondary cylinder 2 arranged side by side as disclosed by Figs. 1 to 3, inclusive, and mounted upon a common base plate 4.

The ends of the primary cylinder 1 are closed by cylinder heads 6 and 7, and the ends of the secondary cylinder 2 are closed by cylinder heads 8 and 9. The cylinder heads 6 and 9 are removably held in place by machine screws 11 and 12, respectively, while the cylinder heads 7 and 8 are removably connected together and to their respective cylinders 1 and 2 by machine screws 14. Tie-bolts 15 are employed in securing the cylinders and their heads together.

18 designates a shaft journaled in the cylinder heads 6 to 9, inclusive, the cylinder heads 6 and 9 being provided with stuffing-boxes 20 and 21, respectively, to prevent the escape of steam around said shaft 18.

24 designates a rotor mounted in the primary cylinder 1 and keyed or otherwise rigidly fixed to the shaft 18, on which it is concentrically arranged, Figs. 3 and 4. Said rotor 24 is provided with equally-spaced U-shaped grooves arranged radially in both ends and across the periphery of said rotor to receive pistons 26, corresponding in general form to said grooves. Each piston 26 embodies a transverse member 28 extending across the rotor 24, and radial members 29 and 30 arranged in the ends of said rotor 24. The transverse members 28 have pin-and-slot connections 32 with the radial members 29, to allow the latter and the radial members 30 to move laterally against the cylinder heads 6 and 7 to take up wear and maintain steam-tight joints.

Coil springs 34 and 35 arranged in recesses in the rotor 24, serve to hold the radial members 30 against the cylinder heads 6 and 7, and said members 30, through the intermediacy of integral arms 37, hold the members 29 against the cylinder heads 6 and 7. The radial members 30 on each side of the rotor 24, are held from longitudinal movement by pins 38, while the members 29 are slidable longitudinally on the members 30 to hold the transverse members 28 in engagement with the bushings 40 and 41, constituting a removable lining for the cylinder 1. The inner end of each member 29 is bifurcated as indicated at 43, to slidably engage a tongue 44 on the respective member 30.

Springs 45 (Fig. 14) are arranged in counterbores 46, in the members 29 and bear at their ends against the members 30 and 29 to force the latter outwardly in order to retain the transverse members 28 in contact with the bushings 40 and 41.

Steam from the cylinder 1 is admitted to the undersides of the transverse members 28 to coact with the springs 45 in holding said members 28 in contact with the bushings 40 and 41 through transverse holes 50 in the members 29, and the springs 34 and 35 are assisted in holding the members 29 and 30 in contact with the cylinder heads 6 and 7, by steam admitted into openings 51 between the members 29 and the transverse members 28. A portion of the steam also passes between the ends of the rotor 24 and the adjacent sides of the members 30, and thus assists the springs 34 and 35 in holding the members 29 and 30 in engagement with the adjacent piston heads. Thus it will be understood that if one or more of the springs grow weak or break, the steam will hold the different members of the pistons in contact with the bushings and the cylinder heads and prevent loss of power by leakage of steam past the pistons.

Packing rings 53 are interposed between the springs 35, and the adjacent sides of the piston members 30, to prevent the steam between said piston members and the rotor 24 from escaping around the shaft 18. In order to avoid excessive friction between the sides of the piston members 29 and the cylinder heads 6 and 7, due to pressure of the springs 34 and 35, said piston members 29 are provided with longitudinal grooves 55 communicating with the transverse holes 50 to admit steam under pressure between said members 29 and the cylinder heads 6 and 7.

The weight of the transverse piston members 28 is reduced by the formation therein of chambers 57, which are closed by plates 58 to prevent pocketing of steam in said chambers 57.

The bushing 40 is eccentric to the shaft 18, so that its upper central portion will bear upon the upper portion of the rotor 24. This arrangement prevents the passage of steam between the engaging portions of said rotor 24 and the bushing 40 and causes the latter to force the pistons inwardly on each revolution, and expose the transverse members 28 of the pistons to the action of live steam admitted to the primary cylinder 1 through an inlet pipe 60, communicating with an inlet port 61 at one side of said primary cylinder. Said inlet port 61 communicates with a steamway 63 extending transversely through the cylinder 1 between the cylinder wall and the bushing 40, which latter has inlet ports 62 to permit the steam to pass through said bushing 40 and act upon the pistons to drive the same and the rotor 24 in the direction of the arrows, Fig. 4.

As the live steam forces the pistons around in the cylinder 1, the major portion of the steam escapes through exhaust ports 66 and 67 in the lower portions of the bushing 41 and the cylinder 1, respectively, while the remainder of the steam escapes through outlet ports 70 in the bushing 40. The outlet ports 70 communicate with a steamway 71, extending transversely through cylinder 1 between the wall of said cylinder and the bushing 40, and communicating with an exhaust port 72 in the side of the cylinder diametrically opposite to the inlet port 61. An exhaust pipe 74 communicates with the port 72 to carry the exhaust steam to atmosphere or to a condenser (not shown), as preferred.

The steamways 63 and 71 are separated from each other by a steam-tight division block 76, extending transversely through the upper portion of the cylinder 1 and held in contact with the top of the bushing 40 by a set-screw 77 threaded in the upper portion of said cylinder 2. As the underside of the bushing 40 is worn away by the pistons, it is forced downwardly into engagement with the rotor 24 by the set screw 77, the bushing 40 being resilient enough to allow its upper portion to be sprung downwardly into engagement with the upper portion of the rotor 24 and thus prevent the passage of steam at this point.

To secure a full head of live steam in the steamway 63, I provide the cylinder heads 6 and 7 with steam chambers 80 which communicate with the inlet port 61 and said steamway 63, and in order to insure a rapid escape of the exhaust steam the cylinder heads 6 and 7 are provided with steam chambers 81, which communicate with the steamway 71 and the exhaust port 72. The chambers 80 and 81 also communicate directly with the respective spaces between the rotor 24 and the opposite ends of the bushing 40.

The cylinder heads 6 and 7 are provided with arcuate grooves 83 and 84, communicating with the steam chambers 80 and 81 through ports 85 and 86, respectively. This arrangement permits live steam to pass from the grooves 83 into the transverse holes 50 of the pistons for the purpose hereinbefore mentioned, while the grooves 84 permit the steam between the piston members and the rotor 24 to readily escape as the transverse members 28 are forced inwardly by the upper right side of the bushing 40. Longitudinal grooves 52 in the front and rear sides of the piston members 29 communicate with transverse openings 52ª, leading to transverse holes 50 to allow the escape of steam between the piston members 30 and the inner ends of said piston members 29, when the latter are forced inwardly by the bushing 40.

The exhaust ports 67 in the lower portion of the cylinder 1 communicate with an exhaust passage 91, which extends transversely through the lower portion of the primary cylinder 1 and communicates with registering ports 92 and 93 in the cylinder heads 7 and 8, respectively. The port 93 communicates with a passageway 94, extending transversely through the lower portion of the secondary cylinder 2 and communicating with a steamway 96, between the cylinder wall and a removable bushing 97 arranged eccentrically to the shaft 18.

The bushing 97 is provided with inlet ports 99 through which the steam passes from the steamway 96 and impinges against pistons 100, mounted in U-shaped grooves in a rotor 102 in the cylinder 2 and concentrically mounted upon the shaft 18 to which it is keyed or otherwise fixed, Figs. 3 and 9. The eccentric bushing 97 is provided with outlet ports 104, whereby the steam after acting on the pistons 100 escapes into a steamway 106 between said bushing 97 and the wall of the secondary cylinder 2. The steamway 106 leads to a transverse exhaust port 108 in one side of the cylinder 2, and escapes through an exhaust pipe 109.

The steamways 96 and 106 extend the entire width of the cylinder 2 and are separated from each other by a division block 111, adjustably fitted in the lower portion of the secondary cylinder 2 and held in engagement with the lower portion of the bushing 97 by a set screw 112, threaded through the lower portion of said cylinder 2. The steamway 96 communicates at its upper end with a port 114, extending transversely through one side of the cylinder 2 and communicating with a pipe 115 equipped with a valve 116.

Steam chambers 120 in the cylinder heads 8 and 9, communicate with the passageway 106 and the port 108, while steam chambers 122 also in said cylinder heads 8 and 9, communicate with the steamway 106 and the passageway 94 and the port 114. The cylinder heads 8 and 9 are provided with arcuate grooves 124 and 125, communicating with the steam chambers 122 and 120 through ports 126 and 127, respectively.

The upper half of the secondary cylinder 2 is lined with a removable bushing 130, arranged concentrically to the shaft 18 and spaced from the periphery of the rotor 102 to expose the outer portions of the pistons 100 to the action of the steam.

As disclosed by Fig. 3, the secondary cylinder 2 is of greater width than the primary cylinder 1 and as disclosed more particularly by Fig. 9, the concentric bushing 130, is arranged in the upper portion of the cylinder instead of at the lower portion as in the primary cylinder 1. This arrangement of the bushings 41 and 130 causes the steam to act on the lowermost pistons in the primary cylinder 1 and on the uppermost pistons in the secondary cylinder 2, and thus prevent undue wear on one side of the shaft 18 and its bearings. In other respects the primary and secondary cylinders and the working parts therein are similar and a detailed description of the pistons 100 is deemed unnecessary.

Admission of steam to and from the cylinders is controlled by a throttle valve 132 (Figs. 10 and 11), embodying a shell 133 and a rotatable valve 135. The shell 133 is connected to an inlet pipe 136 and an exhaust pipe 137, which latter communicates with an exhaust chamber 138 above the valve 135. The underside of the shell 133 is connected to the pipes 60, 74, 109, and 115. When the valve 135 is adjusted to the position disclosed on Figs. 2, 10 and 11 the pipes 60 and 115 communicate with diametrically-opposed ports 140 and 141, respectively, communicating with a horizontal passageway 143 within the valve 135, and the pipes 74 and 109 communicate with diametrically-opposed ports 145 and 147, respectively, extending vertically through said valve 135 and communicating with the exhaust chamber 138. The valve 135 is provided with a tubular stem 150 communicating with the inlet pipe 136 and the chamber 143, and provided with a handle 152 whereby it may be rotated one-fourth of a revolution to change the position of the ports in the valve 135 to reverse the engine, as will hereinafter appear.

Packing rings 155 are interposed between the shell 133 and the valve 135, and packing rings 157 are interposed between said shell 133 and the handle 152 where it fits around the stem 150, to prevent loss of steam.

In order that the steam may be used expansively during a portion of each revolution of the pistons 26 and 100, I provide an automatic cutoff 160, Figs. 12 and 13, embodying a rotary member 161 keyed or otherwise fixed to the shaft 18 and inclosed within a case 163, the central member of which is supported by a standard 165 secured to the top of the base plate 4. The side plates 167 of the case 163 are provided at their upper portions with alined transverse ports 168, which communicate with steam pipes 169 connected to the side plates 167 (Fig. 1), and the inlet pipe 136, which latter has a valve 171 located between the two pipes 169.

The ports 168 which are segmental in form, may be opened to their full capacity or partly closed as desired, by a pair of arcuate valves 173 operably-mounted in corresponding grooves 174 in the side plates 167. The valves 173 are controlled by a U-shaped lever 176, swiveled upon the shaft 18 and provided with a pawl 178 normally held by a spring 179 in engagement with ratchet teeth 180 on the periphery of the case 163, to hold the lever 176 at any point of its adjustment. As disclosed more clearly by Figs. 12 and 13, the U-shaped lever 176 is connected to the valves 173 by screws 182, which extend through slots 184 in the side plates 167.

The rotary member 161 is provided with a transverse port 186, which on each revolution of said member passes the ports 168 and permits the steam to pass therethrough, cutting off the passage of the steam after said port 186 passes the ports 168.

Condensed steam in the passageways 91 and 94 is blown out through drain pipes 190.

The operation briefly stated, is as follows: If the pistons are to be driven in the direction of the arrows, Figs. 4 and 9, the throttle valve 132 is adjusted to bring ports 140 and 141 into coincidence with the pipes 60 and 115, and the ports 145 and 147 into coincidence with the pipes 74 and 109, respectively. The valve 116 is closed and if a continuous supply of steam to the engine is desired, the valve 171 is opened. After the foregoing adjustments have been made live steam passes through the port 140 and enters the port 61 through the pipe 60. It then flows from the port 61 to the space between the rotor 24 and the bushings 40 and 41, through the steam chambers 80 and ports 62. Being unable to pass between the upper portion of the rotor 24 and the upper, central portion of the bushing 40, the steam flows toward the exhaust ports 66 and acts upon the exposed portions of the pistons 26 to drive them in the direction of the arrows. That portion of the steam which does not pass through the ports 66 escapes through the ports 70 in the bushing 40, and passes out of the primary cylinder 1 through the exhaust port 72 and the exhaust pipe 74, which latter conducts it to the port 145 of the throttle valve 132, through the chamber 138 of which it passes to the main exhaust pipe 137.

That portion of the steam which passes through the ports 66, flows through the ports 67 to the passageway 91, thence through the ports 92 and 93 into the passageway 94 in the secondary cylinder 2. The steam then flows upwardly from the passageway 94 to the steamway 96, enters the space between the rotor 102 and the bushings 97 and 120, through the ports 99 and impinges against the pistons 100. After propelling the pistons around to the chamber 120 and the ports 104, the steam escapes into the exhaust port 108 and out through the pipe 109, which latter conducts it to the port 147 in the throttle valve 132, through the chamber 138 of which it escapes to the main exhaust pipe 137.

If maximum power is desired, a portion of the live steam is admitted directly to the secondary cylinder 2, through the pipe 115 by opening the valve 116.

If it is desired to reverse the direction of travel of the pistons, the handle 52 of the throttle valve 132, is swung a quarter of a revolution to bring the ports 140 and 141 into coincidence with the pipes 74 and 109 and the ports 145 and 147 into coincidence with the pipes 115 and 60, respectively. The steam then enters the primary cylinder 1 through the pipe 74 and escapes from said primary cylinder 1 and the secondary cylinder 2 through the pipes 60 and 109, respectively.

If it is desired to cut the steam off during a portion of each revolution of the pistons, the valve 171 is closed to direct the steam to and from the automatic cutoff 160, through the pipes 169.

The movement of the pistons 26 and 100 when forced inwardly by the eccentric bushings 40 and 97, respectively, is attended with but little friction, as the same are relived of steam pressure just before moving inwardly, owing to the elongated ports 70 and 104, which permit quick escape of the steam. The chambers 81 and 120, also offer avenues of escape for the steam.

From the foregoing description, it will be readily understood that I have produced a rotary engine embodying the advantages above set forth, and while I have shown the preferred embodiment of the invention, I reserve the right to make such changes in the construction, combination, and arrangement of parts, as properly fall within the spirit and scope of the claims.

Having thus described my invention, what I claim and desire to secure by Letters Patent, is:

1. In an engine of the character described, a cylinder having inlet and exhaust ports, a shaft journaled in said cylinder, a rotor arranged within said cylinder and concentrically mounted upon the shaft, an eccentric bushing extending part way around the interior of the cylinder provided with inlet and outlet ports communicating with the inlet and exhaust ports of the cylinder, the central portion of said bushing bearing against the rotor, steam chambers in the cylinder heads communicating with the inlet and exhaust ports and the spaces between the rotor and the end portions of the bushing, and pistons carried by the rotor having working parts for exposure to motive fluid within the cylinder during a part of each revolution of the rotor.

2. In an engine of the character described, a cylinder having inlet and exhaust ports, a shaft journaled in said cylinder, a rotor arranged within said cylinder and concentrically mounted upon the shaft, a bushing within the cylinder and provided with inlet and outlet ports communicating with steamways communicating with the inlet and exhaust ports of the cylinder, a portion of said bushing bearing against the rotor, pistons carried by the rotor having working parts for exposure to motive fluid within the cylinder during a part of each revolution of the rotor, a division block separating the steamways and bearing against the eccentric bushing, and steam chambers in the cylinder heads extending from the inlet and exhaust ports to the ends of said division block and communicating with the steamways.

3. In an engine of the character described, a cylinder having inlet and exhaust ports, a rotor arranged within said cylinder and concentrically mounted upon the shaft, an eccentric bushing extending part way around the interior of the cylinder and provided with inlet and outlet ports communicating with steamways leading to the inlet and exhaust ports of the cylinder, the central portion of said bushing bearing against the rotor, pistons carried by the rotor having working parts for exposure during a part of each revolution to motive fluid within the cylinder, steam chambers in the cylinder heads communicating with the steamways therein and the inlet and exhaust ports, and arcuate steamways in the cylinder heads to communicate with openings in the working parts of the pistons, substantially as described.

4. In an engine of the character described, a primary cylinder having diametrically opposed inlet and exhaust ports and an exhaust port intermediate said inlet and exhaust ports, a rotor mounted in and having a portion of its periphery in contact with an eccentric interior part of the primary cylinder, equally spaced pistons carried by said rotor, a secondary cylinder beside the primary cylinder and having an inlet port communicating with the intermediate exhaust port of the primary cylinder, and an exhaust port, a rotor mounted in and having a portion of its periphery in contact with an eccentric part within the secondary cylinder, equally spaced pistons carried by the second rotor, a shaft extending through the axis of the rotors, and steam chambers in the cylinder heads communicating with the inlet and exhaust ports and the spaces between the rotors and the interior of the primary and secondary cylinders.

5. In an engine of the character described, a primary cylinder having an inlet port and two exhaust ports, a secondary cylinder having an exhaust port and two inlet ports one of which latter communicates with one of the exhaust ports of the primary cylinder, a throttle valve connected to the inlet and one of the exhaust ports of the primary cylinder, and to one of the inlet ports and the exhaust port of the secondary cylinder, and rotary pistons mounted in the cylinders.

6. In an engine of the character described, a cylinder having inlet and exhaust ports, a rotary piston mounted in said cylinder, a rotary member driven by said piston and provided with a transverse port, a stationary case inclosing said rotary member and provided with oppositely-disposed ports for communication with the port in the rotary member at every revolution thereof, adjustable means to partly close the ports in said case, a steam pipe leading to one of the ports in the case, and a steam pipe leading from the other port in the case to the inlet port in the cylinder.

7. In an engine of the character described, a rotor having equally spaced U-shaped grooves therein, and pistons arranged in said grooves and each consisting of two oppositely-opposed radial members capable of limited lateral movement on the rotor, two radial members slidable on the two first members, and a transverse member operably-connected to the outer ends of said slidable members.

8. In an engine of the character described, a throttle valve consisting of a shell having four equally spaced ports and an exhaust port, a chambered valve rotatably mounted in said shell and provided with four ports adapted to communicate with the first-mentioned four and two of which communicate with the chamber in the valve, the other two extending through said valve to establish communication with the exhaust port, a tubular stem fixed to the valve to introduce fluid under pressure to the chamber in said valve, and means to rotate the stem and the valve, for the purpose described.

In testimony whereof I affix my signature, in the presence of two witnesses.

AUGUST BRAUER.

Witnesses:
F. G. FISCHER,
L. J. FISCHER.